United States Patent [19]

Peschmann

[11] Patent Number: 5,367,552
[45] Date of Patent: * Nov. 22, 1994

[54] AUTOMATIC CONCEALED OBJECT DETECTION SYSTEM HAVING A PRE-SCAN STAGE

[75] Inventor: Kristian R. Peschmann, San Francisco, Calif.

[73] Assignee: In Vision Technologies, Inc., Foster City, Calif.

[*] Notice: The portion of the term of this patent subsequent to Jan. 26, 2010 has been disclaimed.

[21] Appl. No.: 6,828

[22] Filed: Jan. 21, 1993

Related U.S. Application Data

[63] Continuation-in-part of Ser. No. 770,552, Oct. 3, 1991, Pat. No. 5,182,764.

[51] Int. Cl.⁵ .................................................. G01N 23/04
[52] U.S. Cl. .......................................... 378/57; 378/4; 378/20; 378/62; 364/413.15; 364/413.19
[58] Field of Search ................... 378/4, 8, 54, 57, 62, 378/69, 53, 20; 250/442.11; 364/413.15, 413.14, 413.19

[56] References Cited

U.S. PATENT DOCUMENTS

| | | | |
|---|---|---|---|
| 4,751,722 | 6/1988 | Harding et al. | 378/6 |
| 4,788,704 | 11/1988 | Donges et al. | 378/99 |
| 4,907,152 | 3/1990 | Lempriere | 364/413.18 |
| 4,941,162 | 7/1990 | Vartsky et al. | 378/57 |
| 5,032,990 | 7/1991 | Eberhard et al. | 364/413.15 |
| 5,070,519 | 12/1991 | Stein et al. | 378/146 |
| 5,125,015 | 6/1992 | Shimoni et al. | 378/57 |
| 5,182,764 | 1/1993 | Peschmann et al. | 378/57 |
| 5,212,717 | 5/1993 | Hada | 378/4 |
| 5,218,623 | 6/1993 | Toki et al. | 378/4 |
| 5,260,982 | 11/1993 | Fujii et al. | 378/57 |

Primary Examiner—David P. Porta
Assistant Examiner—Kim-Kwok Chu
Attorney, Agent, or Firm—Flehr, Hohbach, Test, Albritton & Herbert

[57] ABSTRACT

An apparatus for detecting concealed objects, such as explosives, drugs, or other contraband is disclosed. The apparatus uses CT scanning to identify concealed objects with a density corresponding to the density of target objects such as explosives or drugs. To reduce the amount of CT scanning required, a number of prescanning approaches are disclosed. Based upon the prescan data, selected locations for CT scanning are identified. CT scanning is undertaken at the selected locations. The resultant CT scan data is utilized to automatically identify objects of interest. This identification of objects may be verified through further automatic analysis of such attributes as shape, texture, context, and X-ray diffraction. Finally, the objects of interest may be reconstructed and displayed on a computer monitor for visual analysis by an operator.

22 Claims, 10 Drawing Sheets

I: $S_{OUT}(\alpha) \simeq e^{-\mu} D/\sin \alpha$
II: $S_{OUT}(\alpha) \simeq e^{-\mu} L$
III: $S_{OUT}(\alpha) \simeq e^{-\mu} D/\sin \alpha$

AUTOMATIC CONCEALED OBJECT DETECTION SYSTEM HAVING A PRE-SCAN STAGE

This application is a continuation-in-part of Ser. No. 07/770,552, filed Oct. 3, 1991, now issued as U.S. Pat. No. 5,182,764.

BRIEF DESCRIPTION OF THE INVENTION

The present invention relates generally to the detection of concealed objects in closed containers. More particularly, the present invention relates to an efficient method and apparatus for detecting concealed objects by using computerized tomography.

BACKGROUND OF THE INVENTION

X-ray Computed Tomography (CT) is a technique that produces a cross-sectional image of an object from a series of attenuation measurements taken from different angles around the object. CT reconstructed data can provide precise, quantitative information about the characteristics of objects in the scan plane, for instance physical density. While CT technology has been largely applied in medical fields, problems associated with the technology have limited its applicability to other fields. A primary problem with most CT methods is that they are time consuming. Consequently, prior to this invention, CT technology has not been a feasible alternative to such problems as screening luggage for concealed items.

Screening luggage for concealed items is of vital importance. Such monitoring is necessary to avoid smuggling of drugs and to detect explosives planted in luggage by terrorists. Present techniques for screening luggage include manual inspection. Manual inspection is a time consuming and therefore expensive operation. Moreover, manual inspection is not particularly effective unless suspicious items such as transistor radios are routinely disassembled and checked for hidden items.

Thermal Neutron Activation (TNA) systems have been employed in the prior art to detect explosives in luggage. This technique relies upon the detection of the nitrogen associated with explosives. While the technique has enjoyed some success, there are a number of problems associated with it. Namely, the technique is slow because many innocuous items cause false alarms which must be resolved with additional measures.

Another common baggage inspection device is the X-ray line scanner ("concourse scanner") used in practically all public airports. Such systems are deficient in several respects. First, they are merely imaging devices without the capability of automatically identifying target materials like explosives. They also form a cluttered image in which items in a container are projected together and overlaid on each other. These systems require an operator to study and interpret the projection images. Operator fatigue and distraction augment the imperfect nature of the projection method itself.

OBJECTS AND SUMMARY OF THE INVENTION

Thus, it is a general object of the present invention to provide a method and apparatus for detecting a concealed object in a closed container.

It is a related object of the present invention to provide an automated method and apparatus for detecting concealed objects in luggage without operator involvement.

It is a related object of the present invention to provide an automated method and apparatus for detecting explosives hidden in closed luggage.

It is another object of the present invention to efficiently utilize CT technology to detect concealed items.

It is another object of the present invention to expedite CT scanning by providing methods of predetermining sensitive locations for subsequent CT scanning.

It is yet another object of the present invention to automatically analyze the quantity of a target object, thereby indicating whether the object, such as an explosive, represents a threat.

It is a related object of the present invention to provide an apparatus and method for automatically analyzing the shape and texture of an object of interest.

It is another object of the present invention to confidently recognize items of interest by associating the items with probable attributes, for instance associating an object with the density of an explosive with a configuration similar to a detonator or blasting cap.

It is another object of the present invention to aid a human operator by automatically and visually highlighting on a computer monitor objects of interest.

It is still another object of the present invention to aid a human operator by providing a pseudo three-dimensional reconstruction on a computer monitor of a specific object of interest.

It is another object of the present invention to aid a human operator by providing a method of viewing on a computer monitor screen cross sectional planes within the scanned container.

It is yet another object of the present invention to provide a method of identifying sheet-like objects, particularly sheet explosives, by utilizing CT scan data taken during linear conveyor motion.

These and other objectives are achieved by an apparatus for detecting concealed objects, such as explosives, drugs, or other contraband. The apparatus uses CT scanning to identify concealed objects with a density corresponding to the density of a target object such as explosives or drugs. To reduce the amount of CT scanning required, a number of prescanning approaches are disclosed. Based upon the prescan data, selected locations for CT scanning are identified. CT scanning is then undertaken only at the selected locations. The resultant CT scan data is subjected to CT reconstruction, the reconstruction is utilized to automatically identify objects of interest. In the alternative, an X-ray analytical technique involving energy dispersive radiation detection may be used to positively and automatically confirm or rule out a threat.

BRIEF DESCRIPTION OF THE DRAWINGS

For a better understanding of the nature and objects of the invention, reference is made to the following detailed description taken in conjunction with the accompanying drawings, in which.

Like reference numerals refer to corresponding parts throughout the several views of the drawings.

DETAILED DESCRIPTION OF THE INVENTION

Figure 1:
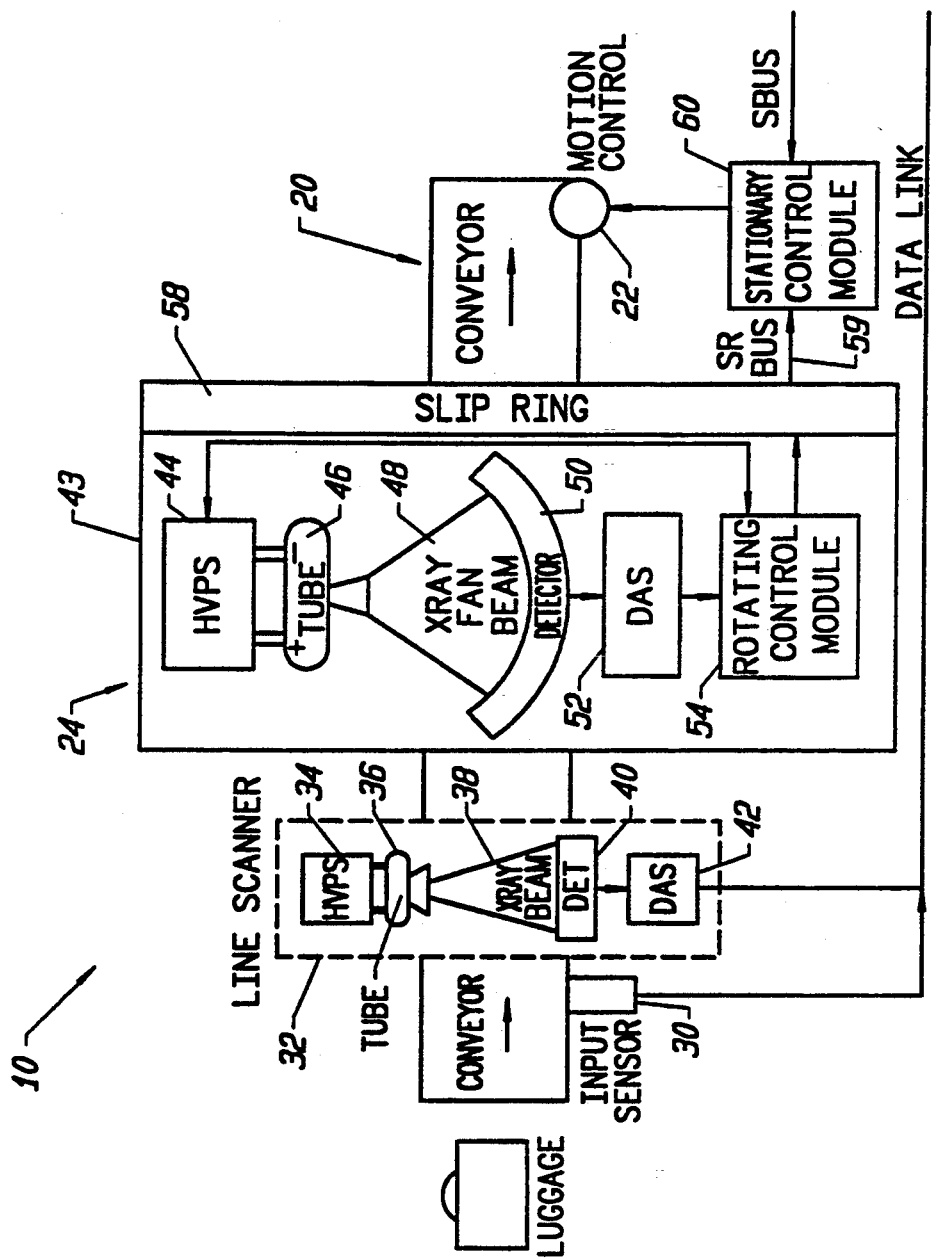
FIG. 1 (shown as FIG. 1—1 and FIG. 1-2)is a block diagram of the individual hardware components of the present invention, with their logical connections.

Referring to FIG. 1, a CT object detector 10 in accordance with the present invention is depicted. As to be more fully described herein, the CT object detector 10 may be used to identify an item in a concealed container. For instance, explosives, drugs, and other contraband may be identified in accordance with the CT object detector 10. By way of example, the present invention is disclosed in relation to the detection of explosives in luggage. However, one skilled in the art will appreciate that the teachings of the present invention are equally applicable to the detection of essentially any item in essentially any container.

By way of overview, the CT object detector 10 may be viewed as including a number of major components. First, a conveyor 20 is provided for moving luggage through a CT gantry system 24. The conveyor 20 is controlled by conveyor motion controller 22 which moves the conveyor forward and backward to discrete positions, as required. Thus, luggage moves along the conveyor 20 and through the CT gantry system 24, allowing the CT system to accumulate scanned data corresponding to cross-sectional views of the luggage. Usually, the conveyor motion will be stopped during acquisition of CT slice data. This data is conveyed to an object detection system 26. As more fully described herein, the object detection system 26 calculates density distribution within the scanned cross sectional images of the luggage. This density information is utilized to identify objects with a target density of interest. In addition to the density information, other acquired information such as texture (for instance, "granularity" of a powder) may be used to corroborate the identification of the object.

If an object of interest is automatically identified by the object detection system 26, an object reconstruction system 28 may be invoked to provide a reconstruction of the object that is easily recognizable for a human operator. In particular, adjacent CT cross sections can be performed and an additional pseudo three dimensional display can be used by an operator to look at the object. Based upon this reconstruction, a determination can be made as to whether a target item has in fact been found. At the same time, information may be available which could be useful to plan the next step of bomb disposal or defusing.

To expedite the operation of the CT object detector 26, a prescan step is employed. The prescan step operates to identify those regions of the luggage which should be CT scanned and those regions which may be disregarded.

This simple overview of the present invention will indicate to those skilled in the art the considerable advantages associated with the invention. Primarily, the luggage does not have to be opened and inspected manually. Naturally, this saves considerable time and expense. It also reduces the chance of injury to the inspector and an intrusion upon the personal belongings of the individual owning the luggage.

These advantages have been achieved through the efficient use of CT technology. Particularly, the prescan step, as will be more fully described herein, reduces the scanning time and total inspection time required for each scanned item, therefore increasing throughput and making CT technology a feasible component of the invention. In addition, novel data processing techniques have reduced the required data processing time while increasing the probability of finding a target object.

Having provided a general overview of the present invention, attention presently turns to a more detailed description of the physical components of the CT object detector 10. The conveyor 20 is preferably coupled to an input sensor 30. The input sensor 30 is coupled through object detection system 26 to conveyor motion controller 22. Luggage is initially sensed by input sensor 30. The exact position of the luggage on the conveyor 20 may be determined through data derived from the input sensor 30, the conveyor 20, and the conveyor motion controller 22, utilizing known techniques. Thus, as will be more fully described herein, after prescanning, the luggage may be conveyed to the CT system 24 so that the luggage may be CT scanned only at desired locations, thereby saving time by eliminating the necessity of CT scanning the entire bag.

One method of achieving prescanning is by utilizing a line scanner 32. Line scanner 32 may be a concourse scanner of the type presently used in airports for scanning of luggage. Line scanner 32 includes a high voltage power supply 34 coupled to an x-ray tube 36. The x-ray tube 36 provides an x-ray beam 38 which travels through the baggage on the conveyor 20. The attenuation of the x-ray beam 38 is a function of the density of the object through which it travels. The detector 40 picks up the x-ray beam 38 and its attenuated components. A data acquisition system 42 is coupled to the detector 40 to receive the detected x-ray data.

As currently employed in airports, the output of such a line scanner is displayed as an X-ray projection image on an image display monitor. An operator studies the image and attempts to decipher whether the image includes a target object. The present invention eliminates the necessity of this human operator function. As will be more fully described herein, the data from the line scanner 32, referred to herein as projection data, is not used to display an image on a monitor for operator viewing, rather it is used to identify CT scan locations. The next scanning operation is undertaken by CT system 24.

The CT system 24 includes components analogous to the line scanner 32. One obvious difference between the units is that the CT system 24 includes a rotating module 43. The rotating module 43 includes a high voltage power supply 44 coupled to an x-ray tube 46 which creates an x-ray fan beam 48 (for display purposes, the orientation of the detector 50 and of the fan 48 are shown rotated by 90 degrees). The x-ray fan beam 48 travels through an opening in the rotating module 43 through which luggage on the conveyor 20 is moved. On the opposite side of the opening within the rotating module 43 is an array of detectors 50 which intercept the x-ray fan beam 48, attenuated by the scanned objects. The detector array 50 is connected to a data acquisition system 52 which converts all detector measurements into a suitable digital format. The data acquisition system 52 also exchanges control signals with a rotating control module 54. In another embodiment, CT data scanning may be generated using a stationary CT system in combination with rotational motion of the object to be scanned.

The rotating module 43 is electrically coupled to the non-rotating portion of the CT object detector 24 via an electromechanical device called a slip ring 58. Through this slip ring, electrical input power is transferred to the rotating power supplies 44; digital data signals and control signals are also transferred to and from the rotating gantry 43 through the slip ring 58. Traditionally, CT scanners have their rotating modules connected to the stationary part via cables, using winding/unwinding mechanisms. By using a slip ring 58, the gantry can rotate continuously and CT scan frequency may be increased, thereby facilitating throughput of scanned containers. The slip ring 58 is coupled through a slip ring bus 59 to a stationary control module 60. The stationary control module 60 provides control signals to the CT system 24 and the conveyor motion controller 22.

The CT scan data accumulated by the CT system 24 is delivered to object detection system 26 through stationary control module 60. The CT scan data provides cross-sectional data regarding selected portions of the luggage on the conveyor 20. This cross-sectional data is analyzed in accordance with the present invention, as will be more fully described below. Suitable components for this analysis are depicted in relation to object detection system 26 of FIG. 1. Object detection system 26 includes a workstation 64. The workstation 64 is coupled to a color monitor 66. Interactive functions with the workstation 64 are achieved through a keyboard 68 and a mouse 70. Disc memory 72 and tape drives 74 are also provided.

The workstation 64 is also preferably coupled to a real time, e.g. VME, computer 76 which provides additional mathematical computing power. Computers with a VME-bus configuration are known in the art. The VME computer 76 preferably includes disc memory 78. A back projector 80 is provided in conjunction with the VME computer 76. The back projector 80, a known device traditionally used in medical CT scanning, performs a major step of the process of CT reconstruction of CT data into image data. The reconstructed CT image data may be displayed on monitor 66. As an alternative to CT reconstruction using backprojector hardware, the Direct Fourier Reconstruction method may be used. As is known in the art, such a method does not require a back projector 80, instead, standard array processors are used. An S bus driver 82 is preferably coupled to the VME computer 76.

After automatic object detection by CT object detector 26, an optional procedure may be invoked wherein an operator can look at the accumulated CT cross sectional images on monitor 66. The automatically identified target objects may be enhanced by color highlighting or other means. The workstation 64 is preferably provided with a standard ethernet network connection. This connection may be used to transmit the images to a remote display station, or to an expert operator who can sequentially look at images from any number of inspection systems.

If between approximately 5 to 200 contiguous CT scans have been taken, they can be displayed to an operator as a pseudo three dimensional image. Such construction of target items is accomplished by an object reconstruction system 28. That is, after an object of interest has been automatically identified, the object reconstruction system 28 may be used to reconstruct and display the object to a human operator for additional interpretation. The display resembles the container as if it was open. The object reconstruction system 28 may utilize a personal computer (PC) 84 coupled to a monitor 86, keyboard 68, and mouse 90. Supplemental disc memory 92 may also be provided. The PC 84 is coupled to a three dimensional reconstruction computer 94, such as the "Voxelflinger" from the Reality Imaging Company. Such a machine provides the computing power to process and display on monitor 86 the three dimensional CT scan data in various ways, including single CT slices, cross-sections at oblique angles, and as three dimensional renderings of user selectable or pre-programmed view angles. As depicted in the alternative embodiment of FIG. 1A, the reconstruction computer 94 may be directly coupled to workstation 64, thereby eliminating the necessity of additional hardware.

Figures 1, 2:
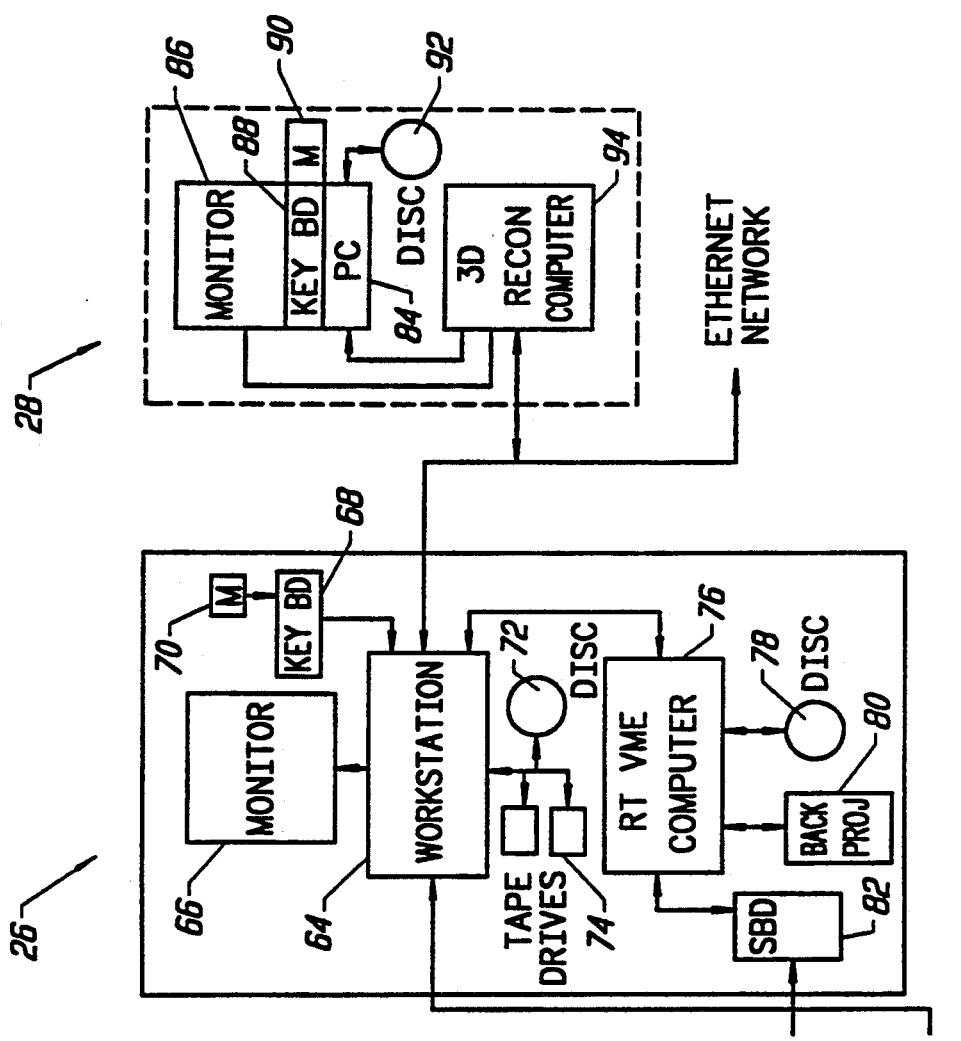
FIG. 2 is a flow chart depicting the major steps in carrying out the present invention.

Having provided an overview of suitable hardware elements to be used in accordance with the invention, attention presently turns to the processing steps to be executed on the hardware. Turning to FIG. 2, the primary processing steps of the present invention are disclosed. Initially, a prescan is undertaken (block 100). The purpose of the prescan is to reduce the time required for CT scanning. That is, through the prescan, a determination is made as to which regions of the luggage need not be scanned. By reducing the amount of CT scanning, throughput is increased.

One method of realizing a prescan is to employ the line scanner 32. The luggage or other container is placed on conveyor 20 which carries the container through the X-ray beam 38. During the motion of the conveyor 20, the intensity of the X-ray beam 38 is continuously measured by detector 40. These intensity values are converted to digital values, corrected for detector gain and offset, and then stored.

Comparing the measured intensities with (I) and without (Io) a container in the X-ray path yields the X-ray attenuation by the container and its contents. This locally measured attenuation is closely related to the mass and its local distribution. More particularly, the logarithm of the relative intensity of the X-ray beam 38 is equivalent to the integral of the linear X-ray attenuation coefficient mu in the path, extending along x, the length of the beam:

$$\log (I/Io) = -\int \mu(x)dx$$

For most materials, the linear X-ray attenuation coefficient mu is proportional to the density. Thus, the logarithm of the relative intensity of the X-ray beam 38 is proportional to the integral of the density of the material within the beam. This is in turn proportional, with a factor k, to the total mass of the material within the beam. This relationship is termed the mass equation:

$$\log (I/Io) = K^* \text{ mass}$$

As the conveyor 20 moves the container through the x-ray beam 38, lines of projection image data are formed. In sum, several hundred lines of projection image data are formed for each scanned container.

The resultant lines of projection image data show the attenuation of X-rays by the container and its contents. The current practice for airport scanners is to have an operator visually inspect this image and attempt to discern items which may be threats.

To eliminate the necessity of a human operator at this point, the present invention automatically interprets the data from the line scanner 32 in order to determine CT scan locations (block 102). CT scan locations are determined by assuming that any X-ray passing through an object of interest will have a minimum attenuation T. The value of T reflects the minimum expected attenuation through the object and the contents which surround the object.

The projected image data is grouped into connected regions of points with attenuation values greater than T. These regions are characterized by: (1) each point within a region having an attenuation value greater than T; (2) each point with an attenuation value greater than T being connectable to other points in the region via a path of adjacent points; and (3) each point in the region being connectable to any other point in the region by such a path.

Once the connected regions are determined, the total mass of each connected region is calculated. This may be done by converting each attenuation value into a corresponding mass value. The mass values may be derived from the previously defined mass equation.

If the total mass of the region is below a target mass M, then that region is eliminated from further analysis. If it is above M, then CT scans are placed so that within the region no object of mass M can fail to be intersected by a CT scan.

Thus, the projection image data provided by the line scanner 32 may be utilized to determine objects or groups of objects within the luggage with a mass greater than the target mass. The workstation 64 may be used to calculate the attenuations, the connected regions, the mass of objects, and to determine the CT scan locations.

The next step associated with the present invention is to take CT scans at the predetermined locations (block 104). That is, CT scans are taken at those locations in the luggage or container which correspond to an object with a mass of interest. The location of the luggage, and more particularly the location of specific objects in the luggage, may be positionally tracked on the conveyor 20. Once the proper position on the conveyor 20 is established in relation to the CT system 24, CT scanning commences and CT data is produced. The conveyor 20 is then moved to the next position. Each complete data set for a CT scan consists of hundreds of attenuation measurements taken from different angles. CT image data may be reconstructed from these attenuation measurements. Each point in a CT image represents the CT density of the items at the position of the CT cross section. The system can also be calibrated to show physical density instead of CT density.

It may have been previously determined that CT scans are not necessary (block 102). That is, the data from the prescan (block 100) may indicate that there are no objects of interest and therefore CT scanning is not necessary. Consequently, the luggage on the conveyor 20 would be quickly moved through the CT gantry system 24 without the delay of CT scanning. Consequently, throughput may be increased by eliminating the necessity of CT scanning every piece of luggage.

The next step associated with the present invention is to identify target objects within the CT image (block 106). Of course, this step and the remaining steps are not necessary if through prescanning it is determined that CT scans are not necessary.

Target objects within CT image data are defined as connected regions with physical density within a preset range. These regions are characterized by: (1) each point within a region having a density within a set range; (2) each point in the image with the density in the set range being connectable to other points in the region via a path of adjacent points; and (3) any point in the region being connectable to any other point in the region by such a path.

Each such region found in the CT image is given an identifying number and the following information is stored for that region: (1) the coordinates of the enclosing rectangle of the region; (2) the area of the region; and (3) the mass. If a connected region is below a preset size, then it may be considered insignificant and not considered as being a target object.

After a target object has been detected in a cross sectional CT image, it may be desirable to further characterize the size, shape, and mass of the object. This is accomplished by taking additional CT scans at positions near the original mass. Each mass is inspected. If a target object is found in a next CT scan with positions consistent with the previous scan, then the object is considered a continuation of the same object.

This identification of objects within a preset density and mass range may be achieved without human intervention. The identity of the object may be confirmed through the use of additional data. For instance if an object with a target density is identified, the texture of the object may be analyzed to determine whether it is consistent with the anticipated texture of an explosive. Other information may also be used, for instance, the shape of the object. The identity of an object may be verified through additional data as described.

After identification of objects through this automated procedure, a verification step may be optionally employed. For instance, to verify an object's identity, target objects may be highlighted (block 108). Objects may be highlighted by assigning a color, for instance red, the density range interest. Therefore, when CT data is projected on monitor 66, those areas highlighted in red will represent the objects of interest. Highlighting therefore provides a method by which the attention of an operator can be directed to critical objects.

In sum, objects with a defined density may be located automatically or with the assistance of a highlighting step. If the luggage does not include an object of interest, the conveyor 20 may move the luggage to another conveyor (not shown) for further handling. On the other hand, if the luggage appears to include an object of interest, the conveyor 20 may move the baggage to a temporary holding location (not shown).

If luggage is moved to a temporary holding location, two options are available. One, the baggage may be inspected by hand; two, the objects of interest may be further investigated in conjunction with the object reconstruction system 28 (block 110). If an object is to be reconstructed, the data associated with the object is conveyed from the object detection system 26 to the object reconstruction system 28. The object reconstruction system 28 therefore allows closer scrutiny of an object of interest while allowing another piece of baggage to be processed by the other elements of the CT object detector 10.

The object reconstruction system 28 allows an operator to display reconstructed CT data in different ways. For example, the CT data may be displayed as oblique cuts at user selected angles or it may be displayed as three dimensional renderings. It is thereby possible to get a view of the density distribution of the container and its contents without the necessity of actually opening and searching the container and disassembling the contained items.

One embodiment of the present invention has been disclosed. Attention now turns to alternate embodiments and special processing techniques which may be required.

Figure 1A:
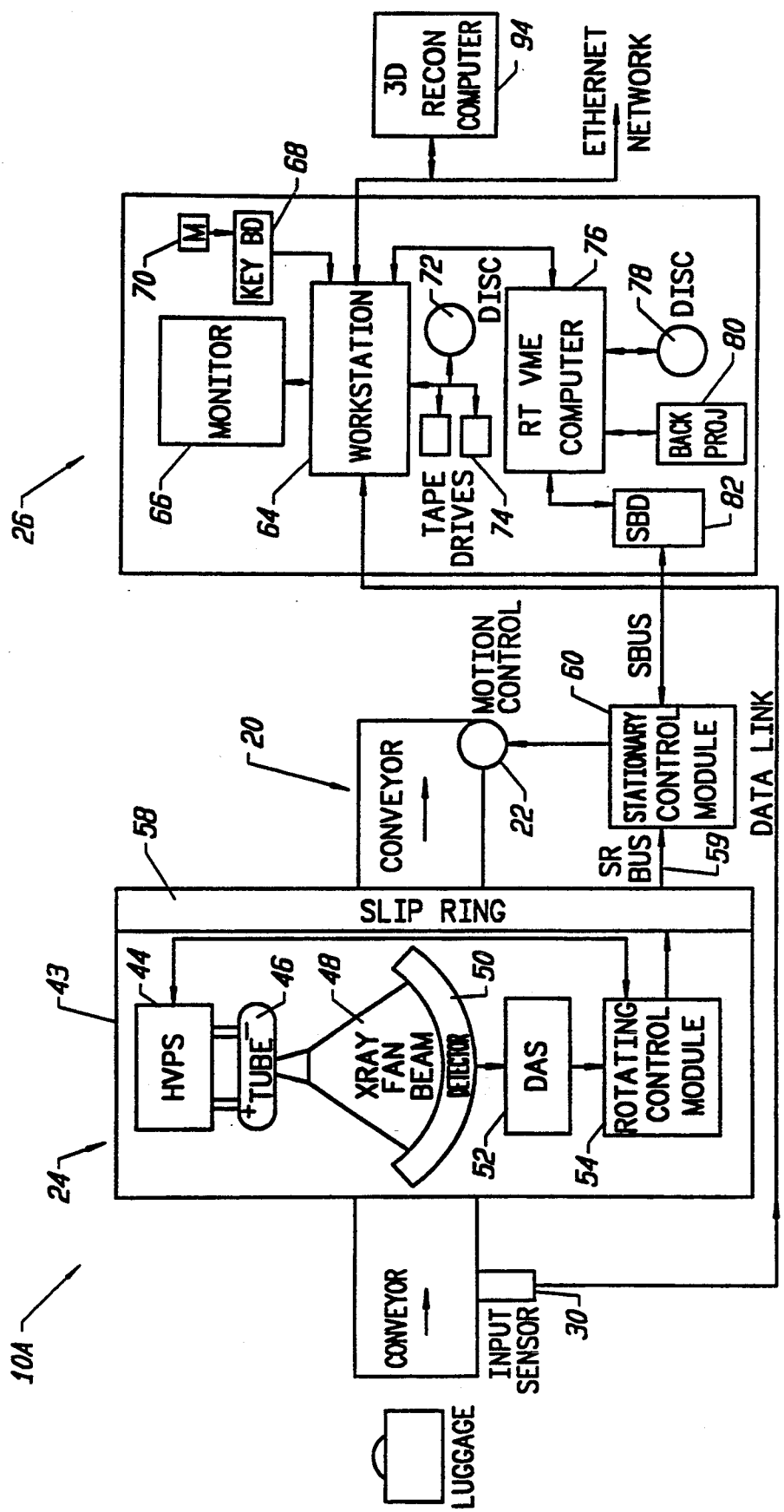
FIG. 1A is a block diagram of individual hardware components of an alternate embodiment of the present invention.
Figure 2:
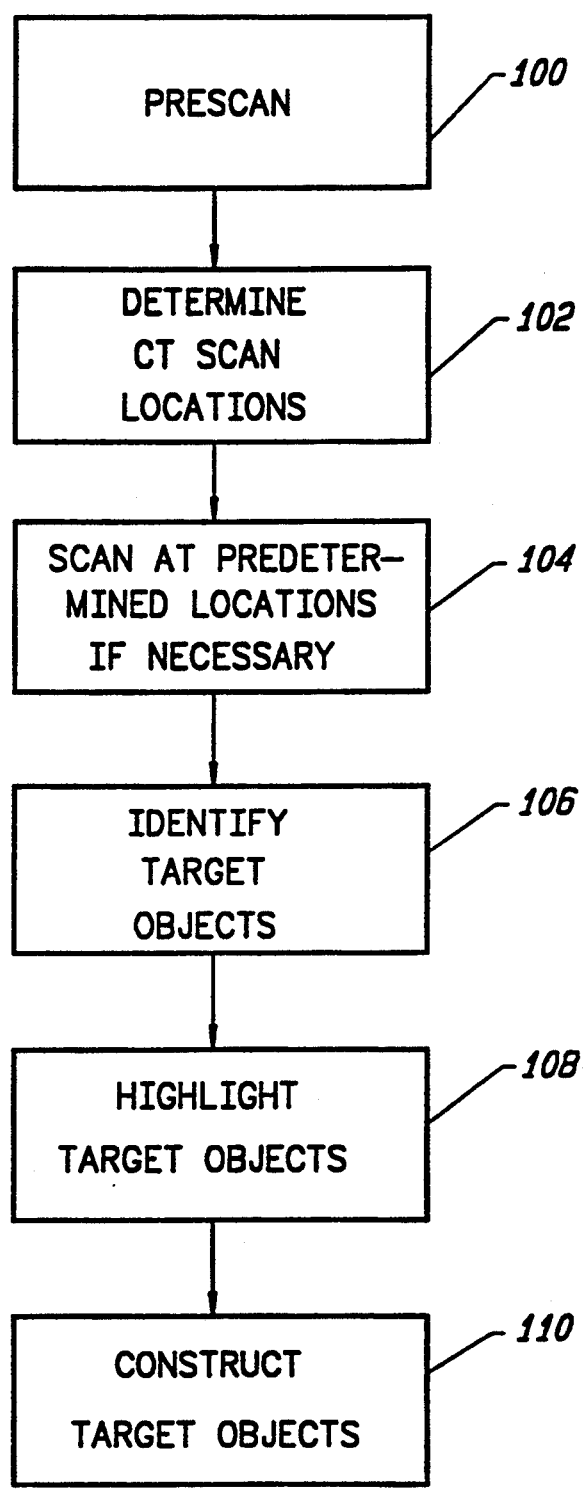

The prescan step may be accomplished without the use of a separate line scanner 32. FIG. 1A depicts a configuration for prescanning without the use of a separate line scanner 32. The CT system 24 may be used to gather scan projection data if the rotating module 43 is held stationary. In this embodiment, the conveyor 20 moves the luggage forward through the stationary CT system 24 to produce a projection scan. The luggage then moves backwards through the CT system 24, the rotating module 43 begins moving, the luggage begins forward movement on the conveyor, and CT scans are taken at the appropriate locations, as previously described.

Another approach to prescanning which does not require a separate line scanner 32 is using the CT system 24 while the rotating module 43 is moving. As used herein, this technique will be called a sino projection. Sino projection data taken while conveyor 20 is moving and rotating module 43 is moving may be used as the previously described projection data to determine where to position CT slices. In particular, mass information may be derived which is equivalent to that produced by a line scanner 32.

One advantage of using sino projection for this purpose is that a dedicated scan projection system is not required. Another advantage is that the quality of the X-ray tube, the X-ray detector, and the data acquisition system used for a CT system is a much higher quality than the components of a scan projection system. Consequently, the information content in the sino projection data is larger than the information content in the scan projection data. This additional information is useful for selecting CT scan locations and thereby reducing the number of necessary CT scans.

Another advantage of the sino projection data is that it can be subjected to CT reconstruction. The prior art teaches that any CT reconstruction from data obtained while an object is substantially moving will be unintelligible. However, it has been discovered that sheet-like objects in a container have a distinct signature within the resultant sino projection data. This signal is particularly distinct when the sheet-like object is parallel to the translatory motion of the x-ray tube 46 on the rotating module 43. Therefore, CT reconstruction of sino projection data is a fast method of detecting sheet-like objects such as sheet explosives.

Figure 3A:
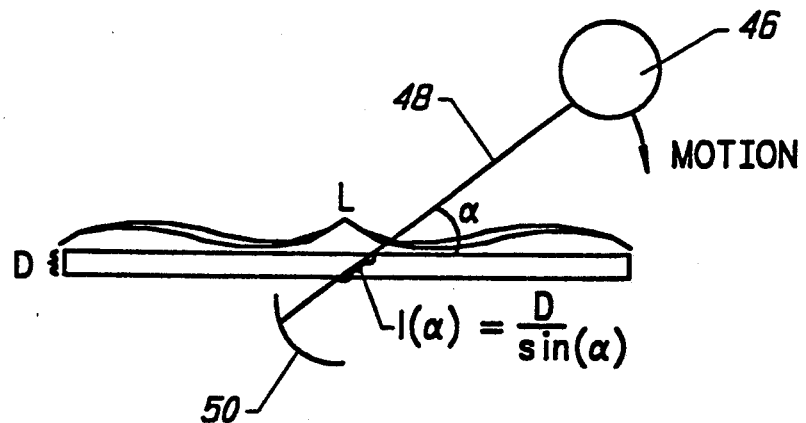
FIG. 3A depicts the parameters associated with identifying sheet-like objects in accordance with one embodiment of the invention.
Figure 3B:
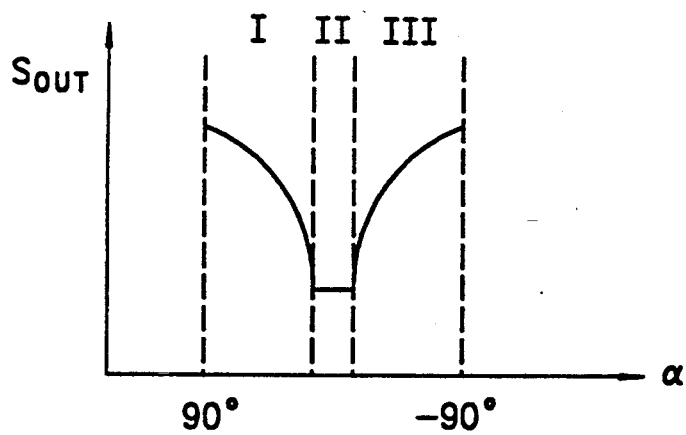
FIG. 3B depicts representative data derived from sino projection data accumulated in accordance with one embodiment of the present invention.

The sino projection data will, if displayed as a sinogram and without the necessity of CT reconstruction, generate a wedge-shaped band with an intensity approximating the function $\exp\{-Mu \times D/\sine(alpha)\}$ where $D/\sine(alpha)$ is the effective attenuation length, D is the sheet explosive thickness, Mu is the linear attenuation coefficient, and alpha is the angle between the x-ray beam considered and the sheet explosive. This relationship is more fully appreciated with reference to FIGS. 3A and 3B. FIG. 3A depicts the angle alpha and the effective attenuation length: $L(alpha) = D/\sine(alpha)$. FIG. 3B depicts the signal produced by sheet explosives with sino projection data. The sino projection data can automatically be inspected for the presence of such a characteristic wedge shaped intensity distribution.

As previously discussed, objects may be identified by their density, in accordance with the present invention. The confidence of this identification may be automatically augmented through additional practical considerations. For example, a known innocuous item with a particular density may also correspond to the density of a target item. The object detection system 26 may increase the probability that a target item, not an innocuous item, has been found if it is known that the innocuous item would not have the mass presently considered. For example, while an innocuous object such as a bottle of woman's make-up may have a density corresponding to a target object, if the detected object has a mass of more than a typical bottle of make-up, the object detection system 26 will have increased confidence that the object is a target object, not merely an innocuous object.

Another technique for increasing the confidence of the identification of a target object is to compare the shape of the object against a list of characteristics corresponding to the target object. For instance, if the shape of the object has a large central area and a small cap-like feature at one end, this shape corresponds to the shape of an explosive with a detonator cap. Thus, expected features in the CT image of a target object may be used to increase the confidence that a target object has been identified.

Other techniques are available to discriminate between target items and innocuous items. One technique is known in CT prior art as dual energy analysis. Dual energy information can be obtained by generating two sets of CT data: one set is obtained at a first voltage setting used to energize the X-ray tube 46 (for example 100 kilovolts) and another set is obtained at a higher voltage (for example 200 kilovolts). The two voltages generate X-rays with two different average energies. If CT reconstruction based on data obtained at two different X-ray energies are compared, their difference can be attributed to the presence of materials with different average atomic numbers. For example, a narcotic such as cocaine can be detected with increased confidence by the added dual energy signature caused by a common admixture, calcium sulfate, which is commonly used to dilute cocaine. The dual energy CT data is compared against known dual energy signatures for target objects, or known dual energy signatures for innocuous objects, so that an innocuous object is not confused with a target object.

Another technique for increasing object recognition confidence is to use texture information. For example, when identifying drugs, the CT cross section through a bag of densely packed pills will show a unique density distribution pattern. Such a pattern may be automatically recognized. An automatic inspection procedure may look for maximum values of the spatial frequency spectrum in the range given by the size of the pills. It is also possible to low-pass filter the CT image and to determine the standard deviation. The standard deviation attains maximum values for textures which have spatial frequencies near the low pass frequency. Image processing steps involved in the automated inspection of textures are known to those skilled in the art of digital image processing.

A prescreening step may be employed prior to the prescan step to find non-threatening luggage. In the case of explosives, prescreening may be accomplished by thermo neutron activation (TNA) measurements. As is known in the art, upon excitation by thermal neutrons, nitrogen nuclei will emit a nitrogen signal which may be used to detect the presence of nitrogen containing objects, and in particular explosives. Other prescreening techniques may also be utilized. One skilled in the art will recognize that vapor sniffing, acoustical vibration analysis, mechanical vibration analysis and other techniques will provide the requisite prescreening information.

The processing rate of the described apparatus may be improved by utilizing a dual CT-slice apparatus in accordance with another embodiment of the invention. The dual CT-slice apparatus of the invention utilizes a second X-ray tube and detector on the rotating gantry. This approach is advantageous because it eliminates some of the overhead associated with adjusting the position of the conveyor 20. That is, two CT-slices of data can be obtained during one conveyor stop.

The conveyor positions a container for a first CT slice, and a secondary slice positional mechanism moves the second X-ray tube and detector to a predetermined location displaced from the first slice location. Since the CT-slices are taken in pairs, the number of conveyor movements is substantially reduced, typically in half. This results in increased container throughput.

If the second X-ray tube is angularly offset from the first X-ray tube, then interference of the X-ray tubes and of the detector arrays can be avoided and the linear separation of the two CT slices can be minimal, or even zero, if required. If the X-ray tubes receive different acceleration voltages or their X-ray fans are filtered differently, the respective X-ray spectra emitted will be different. Hence, CT data can be collected at two different X-ray energies. This may render a dual energy analysis of the type previously described. Similarly, one of the detector systems can be constructed to contain a larger number of detectors in its array. This will result in CT data with higher resolution, allowing the resolution of smaller details in the objects scanned. Higher resolution facilitates the detection of items which are difficult to identify, such as sheet explosives. The number of detectors used in a particular array may be altered by using a conventional switched network circuit.

The offset CT acquisition systems can be used during the sino projection step previously described. The projection data can be from two different angles, thereby generating nonredundant information about the mass or object distribution in the suitcase.

Figure 4:
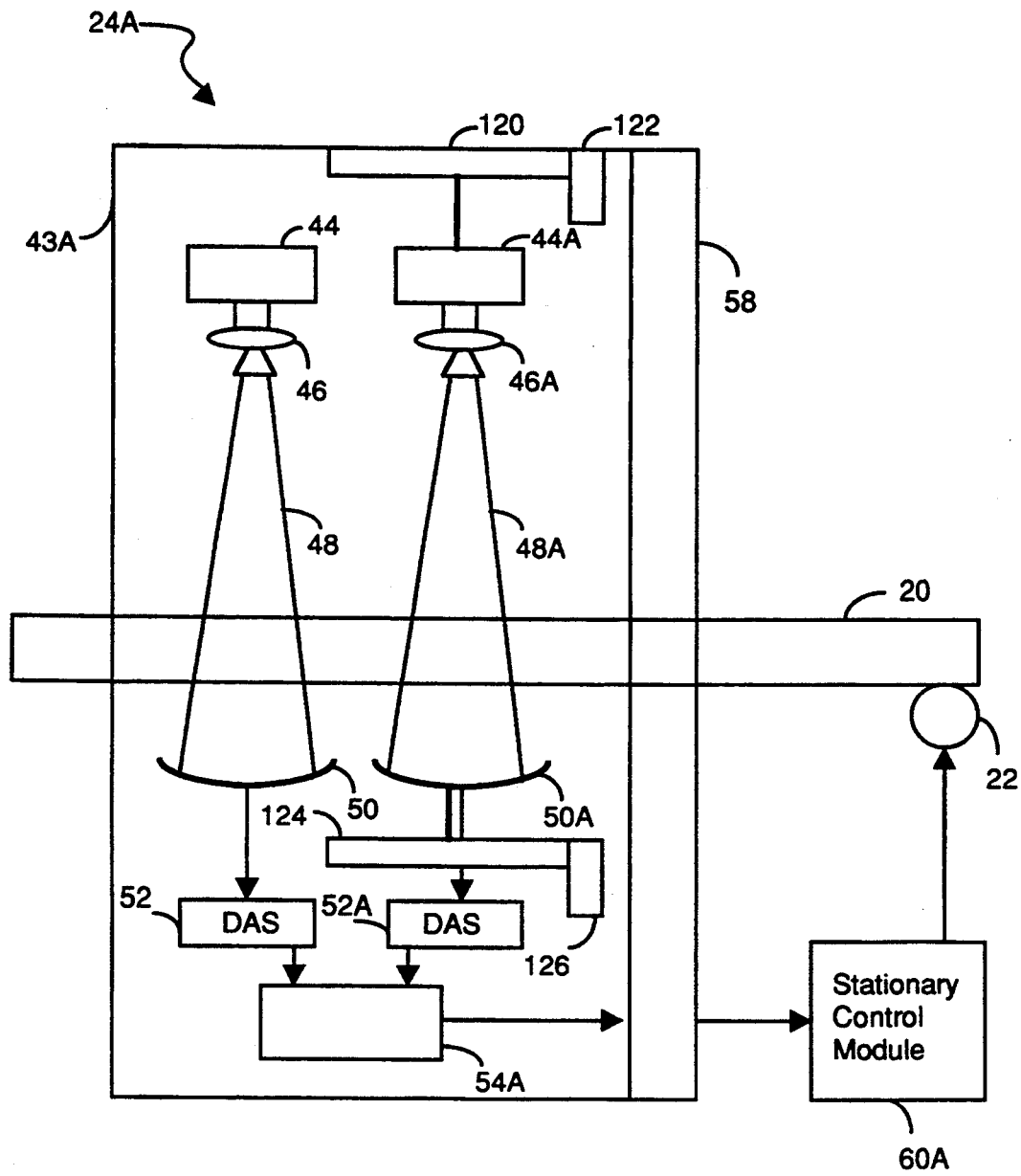
FIG. 4 is a schematic representation of a dual CT-slice gantry apparatus which may be used in accordance with one embodiment of the invention.

FIG. 4 depicts a side view of a dual CT-slice apparatus 24A in accordance with the invention. The apparatus is similar to the CT system of FIG. 1, but includes means for obtaining an additional CT-slice during a single conveyor stop. Note that the detector 50 and fan beam 48 are rotated 90 degrees for display purposes. In an actual device, the orientation of the detector 50 and fan beam 48 would be normal to the page.

As depicted, the apparatus 24A includes a high voltage power supply 44 coupled to an X-ray tube 46; a corresponding detector 50 is provided to receive the X-rays generated by the X-ray tube 46. A data acquisition system 52 receives the data from the detector 50 and conveys it to a rotating control module 54A, as previously described. The apparatus 24A departs from the apparatus of FIG. 1 in that a second X-ray system is provided. The second X-ray system includes an X-ray tube 46A which is powered by high voltage power supply 44A to generate X-rays which are detected by detector 50A. The output of the detector 50A is conveyed to a data acquisition system 52A, which conveys the data to the rotating control module 54A. The power supply 44A and the second X-ray tube 46A are coupled to a track 120 and drive mechanism 122 which move the components along the axis of the conveyor 20. Analogously, the detector 50A is coupled to a track 124 and drive mechanism 126 to receive the output from the X-ray tube 46A. The drive mechanisms 122 and 126 receive control signals from the rotating control module 54A, which, in turn, is controlled by the stationary control module 60A. The stationary control module 60A provides positioning information for the second CT-slice. In other words, the stationary control module 60A defines both a conveyor position and an offset position for the second X-ray system. Typically, the offset position will be between 0 and 6 inches from the position of the first CT-slice. The position for the second CT-slice is determined through the prescanning techniques previously described.

Figure 5:
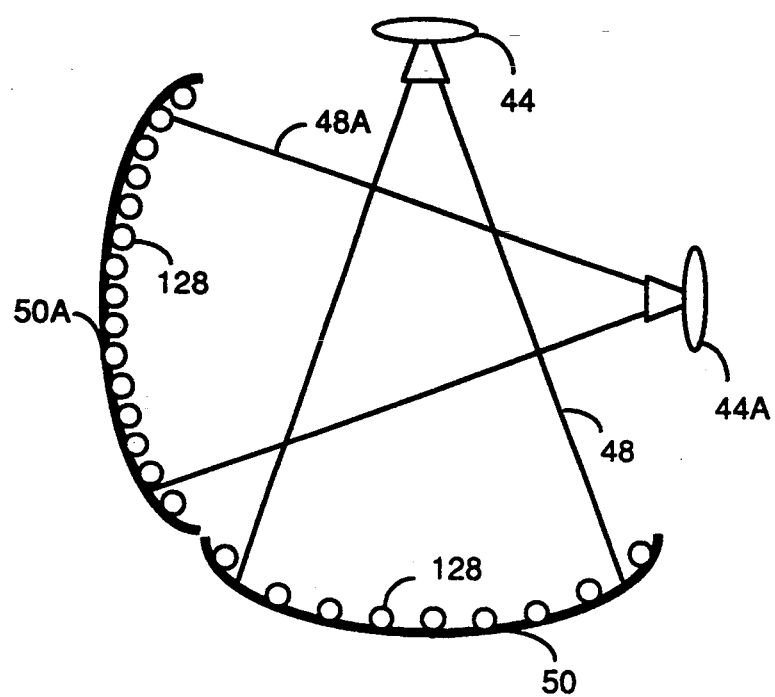
FIG. 5 depicts angularly offset X-ray devices which may be used in accordance with the embodiment of FIG. 4.

FIG. 5 depicts that the X-ray systems may be angularly offset from one another to prevent unwanted interaction between the respective systems. In particular, the second X-ray system is offset approximately 60° from the first system. Note that the detector 50A includes approximately twice as many detectors 128 as in detector 50. Thus, detector 50A may be used to obtain high resolution images, as previously discussed.

In FIG. 2 and its accompanying description, object verification steps (blocks 108 and 110) are described. The verification steps entail utilization of an object reconstruction system 28 to display reconstructed CT data in different ways. An alternate verification step in accordance with another embodiment of the invention is to utilize an X-ray analytical method based on energy dispersive or X-ray spectral measurements. X-ray analytical methods are known in the art. This technique evaluates the scattering of X-rays generated by an object within the original path of the X-rays. The angle of scattering is a function of the molecular structures of the object through which the X-rays travel. As a result, the detected X-rays include essential information on the identity of the object examined. X-ray analysis is described in textbooks such as "X-ray Diffraction" by B. E. Warren, (Dover 1990; see pages 116–127). The techniques are described in U.S. Pat. No. 4,751,722, which is expressly incorporated by reference herein.

The X-ray analytical method may be utilized in accordance with the present invention. After prescanning (block 100), determination of CT scan locations (block 102), scanning at the CT scan locations (block 104), and preliminary object detection (block 106), the energy dispersion method may be employed to verify the identity of an object. The energy dispersion method is practical in this context because objects of interest have already been quickly identified. In the absence of the preliminary steps described, the technique would not be practical because the entire container would need to be processed.

Figure 6:
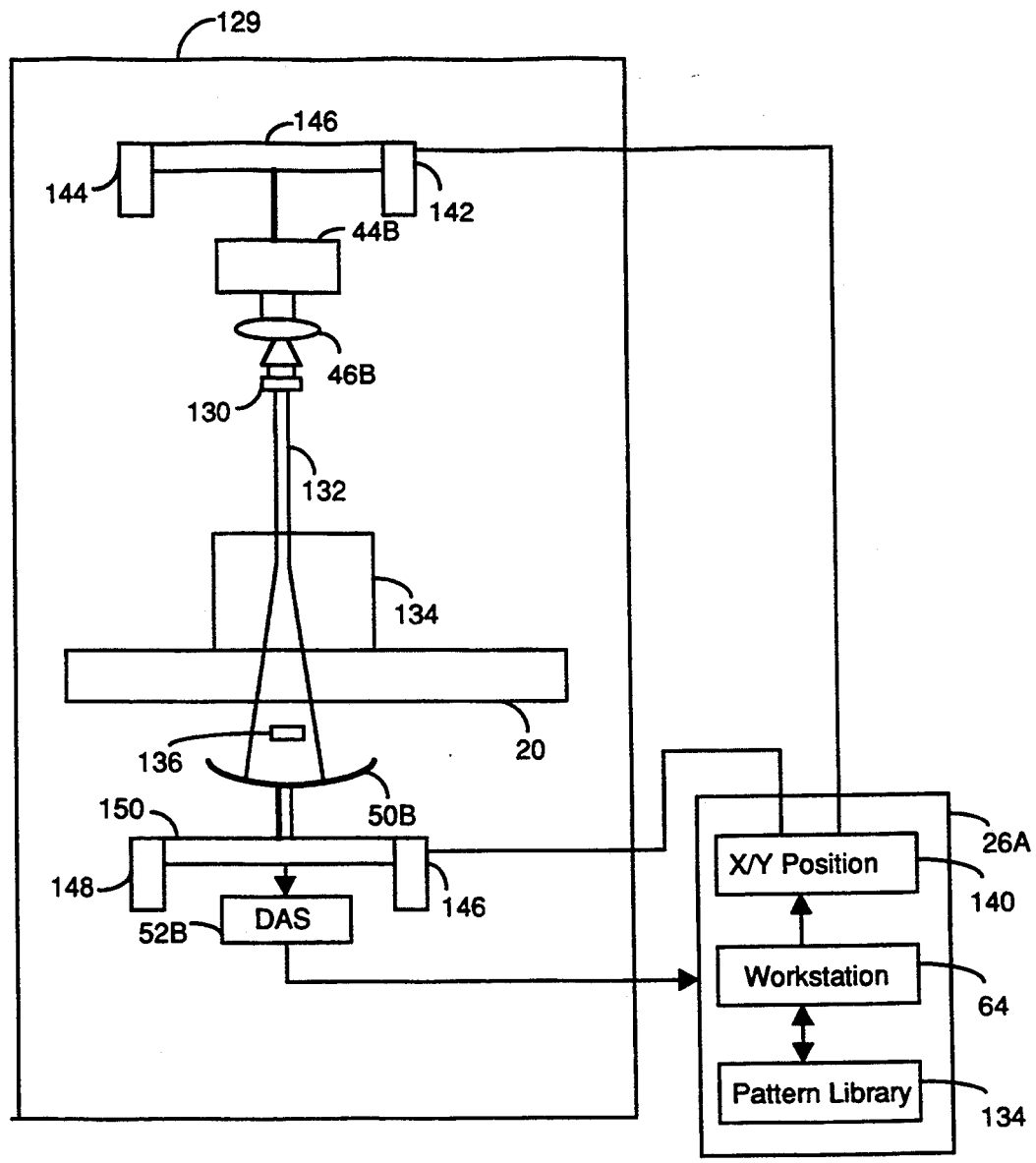
FIG. 6 is a schematic representation of an energy dispersion apparatus which may be used in accordance with another embodiment of the invention.

FIG. 6 depicts an apparatus which may be used in accordance with the X-ray analytical embodiment of the invention. An X-ray analysis apparatus 128 is provided. In a preferable embodiment, a container on conveyor 20 is automatically positioned within the apparatus 128 through operation of the stationary control module 60 (not shown). The apparatus 128 includes a high voltage power supply 44B and an X-ray tube 46B. The generated X-rays are conveyed through a collimator 130. The resultant collimated X-ray beam 132 is intercepted by object 134, causing dispersion of the X-rays. An X-ray block 136 absorbs a majority of the X-rays, while the detector 50B absorbs the dispersed X-rays. The dispersed X-rays are processed by a conventional data acquisition system 52B and the resultant data is conveyed to object detection system 26A.

The object detection system 26A includes workstation 64 which is coupled to a pattern library 138. The pattern library 138, which may be stored on disc 72 or tape drives 74, includes dispersion pattern data on objects of interest. The accumulated data is compared with the pattern library to identify objects of interest.

The object detection system 26A also includes an x/y position command generator 140. The command generator 140 relies upon the positional information for the objects to be identified, already acquired through previous processing steps, to establish actuator commands to position the X-ray tube 46B and the detector 50B. The conveyor 20 provides one positional coordinate, say the z-axis position, running left to right on the page. The x-axis may be considered to project through the page, and the y-axis may be considered to run from the top of the page to the bottom of the page. The power supply 44B, X-ray tube 46B, and collimator 130 may be positioned by an x-coordinate drive mechanism 142 and a y-coordinate drive mechanism 144 which move the elements over a grid 146. Similarly, the detector 50B may be positioned by an x-coordinate drive mechanism 146 and a y-coordinate drive mechanism 148 to position it on a grid 150. The y-coordinate may be established by the y-coordinate drive mechanism 142 and y-coordinate drive mechanism 148 may be fixed. Note that the y-coordinate positioning scheme allows the accumulation of dispersion data for a particular y-coordinate location within the container 134. Any number of known positioning techniques may be used to locate the X-ray equipment.

When applied in accordance with the present invention, the energy dispersion technique provides a number of benefits. First, it provides an automatic alternate mechanism to the operator dependent image interpretation approach. It also provides a mechanism for precise object identification. Since the energy dispersion apparatus 128 may be added to the existing object detection elements, it may facilitate container throughput.

Another embodiment of the invention relates to an alternate method of identifying where to position CT slices. As previously discussed, the placement of CT slices is dependent upon the total mass of a region which is compared to a target mass equal to the critical mass to be identified. If the total mass of the region is greater than the target mass, a CT slice is placed through the mass to obtain further information about the object. The mass information provided by the prescan data may include mass information for a number of layered objects. The CT slice can provide mass information on individual objects in the container, not merely the cumulative mass information for layered objects associated with the projected image data obtained through the prescan.

In any event, the mass division approach of the described prescan method results in an average number of CT-cuts per container equal to the average container weight divided by the critical mass. To increase throughput, it would be advantageous to reduce the number of required CT-slices.

Figure 7:
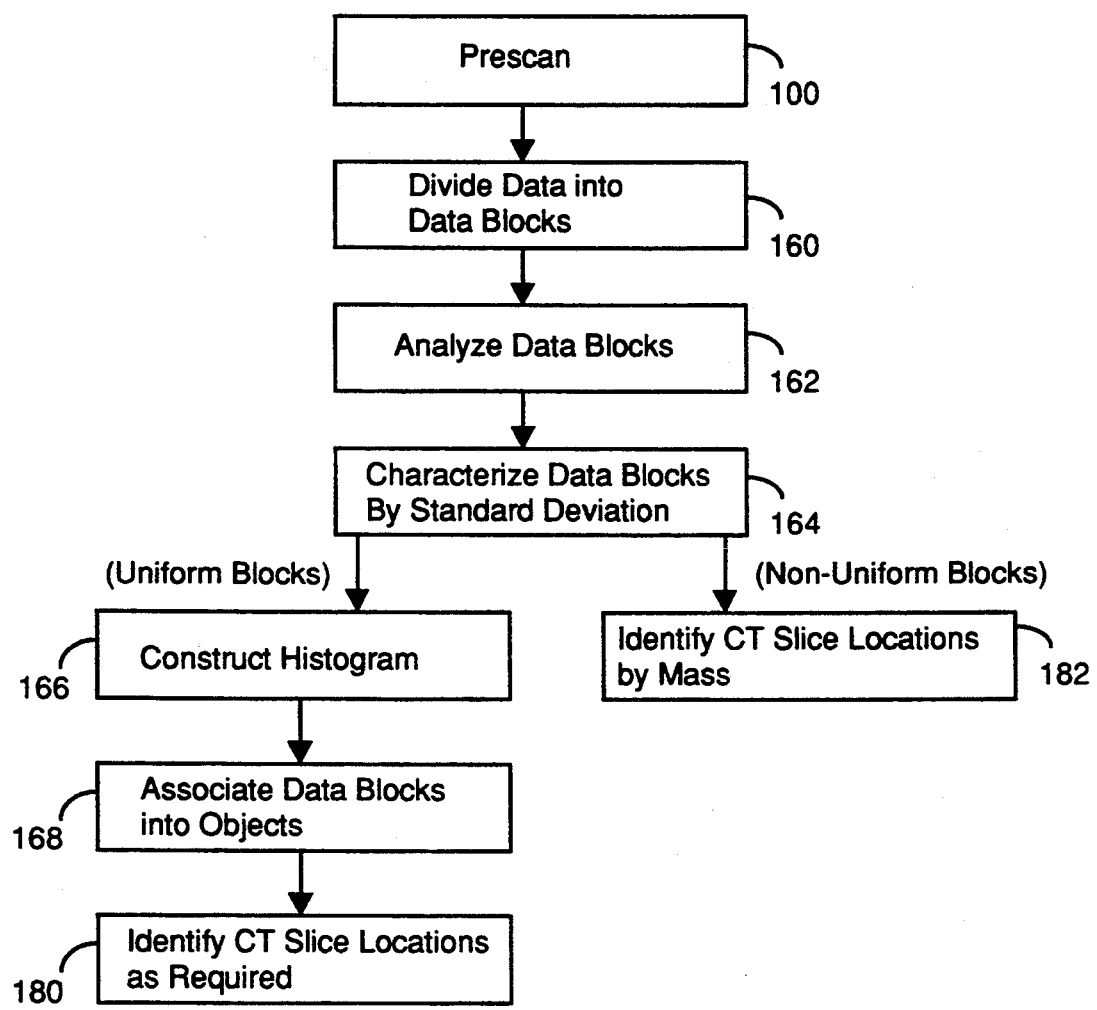
FIG. 7 is a flow chart depicting the block/standard-deviation technique of the invention.

A reduction in the number of required CT-slices may be obtained with the "block/standard-deviation" approach associated with an alternate embodiment of the present invention. This technique is disclosed in relation to FIG. 7. The "block/standard-deviation" technique is an alternate method of determining the placement of CT slices. With this technique, we split a projection or pre-scan image in two "segments". One segment of the image will contain all those portions of the image which have largely uniform attenuation. The other segment contains the remainder of the image, representing those portions of the image without uniform attenuation.

Frequently, the uniform areas are caused by individual objects in the container. The image areas defined by a number of coherent uniform blocks, blocks with low standard deviation, might therefore be called quasi-objects. Instead of placing CT cuts at certain mass increments, the CT scans can now be placed to go through each object only once, and thereby characterize the entire object or quasi-object, even if its mass is a multiple of the critical mass screened for. The cutting by mass is then independently applied to the remaining non-uniform image segment. This method is especially successful in minimizing the number of necessary CT scans for containers exhibiting scan projection images which are relatively uncluttered and show a relatively small number of large quasi-objects.

The first step associated with the technique is to prescan a container (block 100) and thereby accumulate projection image prescan data which includes a set of attenuation values. The next step of the method is to divide the prescan image data into data blocks formed by a raster (block 160). This step is illustrated in relation to FIG. 8 which identifies 16 sequentially numbered data blocks.

The next step associated with the method is to determine the average attenuation and standard deviation value for each data block (block 162). By way of example, each data block in FIG. 8 includes an average attenuation value ("A"—in bold) and a standard deviation value "SD —in italics). Based upon this information, the data blocks can be identified as either uniform or non-uniform blocks (block 164). A "uniform" block will have a low standard deviation value, for instance, less than 1, while a "non-uniform" block will have a high standard deviation value, for instance, greater than 1. Thus, in the example of FIG. 8, data blocks 1, 2, 3, 5, 9, 10, 11, 13, 14, and 15 would be characterized as uniform blocks.

Figures 8, 9:
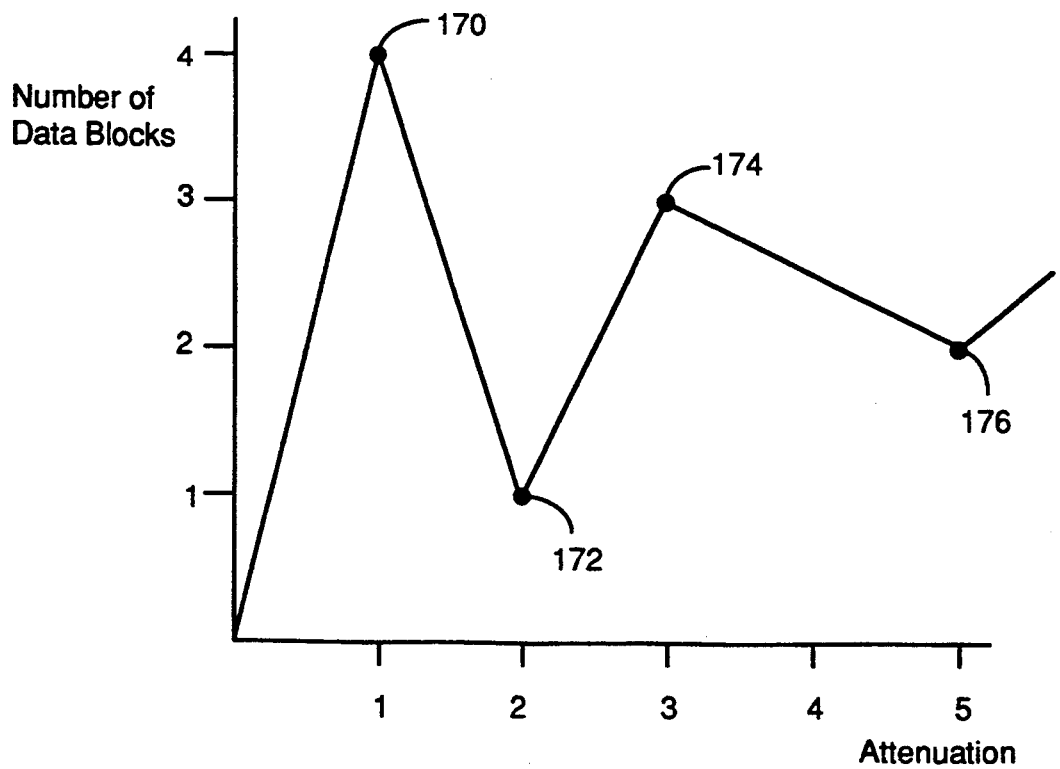
FIG. 8 depicts data values which may be processed in accordance with the block/standard-deviation technique of the invention.
FIG. 9 depicts a simplified histogram constructed in accordance with the block/standard-deviation technique of the invention.

After the uniform data blocks are identified, they may be characterized through a histogram (block 166). The histogram plots the average attenuation values of the blocks as a function of the frequency of the occurrence of such values. FIG. 9 depicts a histogram corresponding to the data of FIG. 8. The histogram reflects that there are four data blocks with an attenuation value of one, one data block with an attenuation value of two, three data blocks with an attenuation value of three, two data blocks with an attenuation value of five, etc.

Physical objects may be identified from the resultant histogram (block 168). In many practical cases, especially in cases of little image clutter, each inflection point in the histogram corresponds to a uniform object. Thus, in FIG. 9, the inflection points 170, 72, 174, and 176 correspond to uniform objects within the prescan data. Hence, the foregoing steps may be used to group objects within the prescan data.

The next step associated with the block/standard-deviation technique is to identify required CT-slice locations (block 180). In general, a CT-slice will be required through every object which has an average attenuation value over a given threshold. Thus, by grouping objects, the block/standard-deviation method has the potential for reducing the number of required CT slices since only one CT slice is required per object. The density information obtained from the CT slice and the CT slice cross section area can be combined with the area information from the block/standard-deviation technique to calculate the mass of the object.

The block/standard-deviation method also provides a mechanism for readily determining regions within the container which do not require a CT slice. For example, objects with a low attenuation value may be dismissed if one is searching luggage for explosives. In such a case, the low attenuation value probably corresponds to clothing or books, and otherwise does not represent a threat of being an explosive. In the example data of FIG. 8, the low attenuation values of data blocks 1, 5, 9, and 13 allow that region of the container to avoid further processing with a CT slice. Even if a CT slice is required for a different region of the container, the block/standard-deviation data may be used to ignore certain portions of the data slice which are known to include low attenuation values.

The non-uniform regions of a container are processed in a separate fashion. Non-uniform regions generally correspond to a number of objects in a small area or correspond to the edges of uniform regions. The required CT-slice positions in these areas are determined by mass (block 182). This process is similar to the process previously described for determining CT-slice placement. Namely, the mass of a region is accumulated until it reaches a target mass, when the target mass is reached, a CT slice is made.

When executing the block/standard-deviation technique one will often find a non-uniform segment within an otherwise uniform region. The non-uniform segment may be attributable to an artifact such as a button on clothing. The CT-slice positions are preferably modified to avoid these regions.

In still another embodiment of the invention, a minimum attenuation value is subtracted from the measured attenuation value (I) obtained during the prescanning step. The subtracted attenuation value should correspond to the attenuation attributable to the walls of the container being scanned. While the attenuation attributable to a container will vary widely from container to container, subtracting an attenuation value of 1/e or 0.37 from the measured attenuation value (I) has been successful.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. An apparatus for automatically detecting a target object within a container, said apparatus comprising:
   means for prescanning said container to form prescan data;
   means for determining a first selected location and a second selected location for CT scanning of said container, said determining means utilizing said prescan data;
   means for simultaneously CT scanning said container at said first selected location and said second selected location to form CT data, said CT scanning means being responsive to said determining means; and
   means for analyzing said CT data to identify target object data within said CT data having an associated mass corresponding to an associated mass of said target object in said container, said analyzing means receiving said CT data from said scanning means.

2. The apparatus of claim 1 wherein said CT scanning means includes a first X-ray system and a second X-ray system on a rotating gantry.

3. The apparatus of claim 2 wherein said first X-ray system is angularly offset from said second X-ray system.

4. The apparatus of claim 1 wherein said prescan data generated by said prescanning means includes a plurality of radiation attenuation values.

5. The apparatus of claim 4 wherein said prescanning means further includes means for subtracting a predetermined radiation attenuation value from each of said plurality of radiation attenuation values, said predetermined radiation attenuation value corresponding to the attenuation caused by said container during said prescanning step.

6. The apparatus of claim 4 wherein said determining means includes:
   means for arranging said prescan data into data blocks, each of said data blocks including a plurality of said radiation attenuation values; and
   means for analyzing said data blocks to establish a plurality of average radiation attenuation values and standard deviation values corresponding to said plurality of radiation attenuation values associated with each of said data blocks.

7. The apparatus of claim 6 further comprising:
   means for constructing a histogram based upon said plurality of average radiation attenuation values and standard deviation values; and means for identifying quasi-objects based upon said histogram.

8. The apparatus of claim 1 further comprising an X-ray scattering system with radiation scattering detection to identify said target object within said container.

9. An apparatus for automatically detecting a target object within a container, said apparatus comprising:
   means for prescanning said container to form prescan data;
   means for determining selected locations for CT scanning of said container, said determining means utilizing said prescan data;
   means for CT scanning said container at said selected locations to form CT data, said CT scanning means being responsive to said determining means;
   means for analyzing said CT data to preliminarily identifying target object data within said CT data having an associated mass corresponding to an associated mass of said target object in said container, said analyzing means receiving said CT data from said scanning means; and
   an X-ray analytical mechanism, activated in response to said analyzing means, for confirming the identity of said target object in said container.

10. The apparatus of claim 9 wherein said determining means includes:
    means for determining a first selected location and a second selected location for CT scanning of said container.

11. The apparatus of claim 10 wherein said CT scanning means includes:
    means for simultaneously CT scanning said container at said first selected location and said second selected location to form CT data.

12. The apparatus of claim 11 wherein said CT scanning means includes a first X-ray system and a second X-ray system on a rotating gantry.

13. The apparatus of claim 12 wherein said first X-ray system is angularly offset from said second X-ray system.

14. The apparatus of claim 9 wherein said prescan data generated by said prescanning means includes a plurality of radiation attenuation values.

15. The apparatus of claim 14 wherein said prescanning means further includes means for subtracting a predetermined radiation attenuation value from each of said plurality of radiation attenuation values, said predetermined radiation attenuation value corresponding to the attenuation caused by said container during said prescanning step.

16. The apparatus of claim 14 wherein said determining means includes:
    means for arranging said prescan data into data blocks, each of said data blocks including a plurality of said radiation attenuation values; and
    means for analyzing said data blocks to establish a plurality of average radiation attenuation values and standard deviation values corresponding to said plurality of radiation attenuation values associated with each of said data blocks.

17. The apparatus of claim 16 further comprising:
    means for constructing a histogram based upon said plurality of average radiation attenuation values and standard deviation values; and
    means for identifying objects based upon said histogram.

18. A method of automatically detecting a target object within a container, said method comprising the steps of:
    prescanning said container to form prescan data including a plurality of radiation attenuation values;
    determining first and second locations for CT scanning of said container, said determining step relying upon said prescan data;
    CT scanning said container simultaneously at said first and second locations to form CT data; and
    identifying automatically said target object within said CT data, said identifying step relying upon said CT data from said scanning step.

19. The method of claim 18 further comprising the steps of:
    arranging said prescan data into data blocks, each of said data blocks including a plurality of said radiation attenuation values; and
    analyzing said prescan data blocks to establish a plurality of average radiation attenuation values and standard deviation values corresponding to said plurality of radiation attenuation values associated with each of said data blocks.

20. The method of claim 19 further comprising the steps of:
    constructing a histogram based upon said plurality of average radiation attenuation values and standard deviation values; and
    means for identifying objects based upon said histogram.

21. The method of claim 18 wherein said prescanning step further includes the step of subtracting a predetermined radiation attenuation value from each of said plurality of radiation attenuation values, said predetermined radiation attenuation value corresponding to the attenuation caused by said container during said prescanning step.

22. The method of claim 18 wherein said identifying step includes the step of:
    utilizing an X-ray scattering apparatus to identify said target object.

* * * * *